United States Patent [19]

Cooley

[11] 3,845,408
[45] Oct. 29, 1974

[54] LASER GLASS HOST COMPOSITIONS COMPRISING $TeO_2$, SRO AND ZNO
[75] Inventor: Richard F. Cooley, Toledo, Ohio
[73] Assignee: Owens-Illinois, Inc., Toledo, Ohio
[22] Filed: June 27, 1973
[21] Appl. No.: 373,925

[52] U.S. Cl.................. 331/94.5 E, 252/301.4 R, 252/301.6 R, 106/47 Q
[51] Int. Cl......... H01s 3/00, C03c 3/12, C03c 3/30
[58] Field of Search....................... 106/47 Q, 47 R; 331/94.5 E; 252/301.4 R, 301.4 F, 301.6 R

[56] References Cited
UNITED STATES PATENTS
3,423,326  1/1969  Redman..................... 252/301.6 R FOREIGN PATENTS OR APPLICATIONS
736,073  8/1955  Great Britain.................. 106/47 Q
741,986  12/1955  Great Britain.................. 106/47 Q
1,496,561  9/1972  Germany......................... 106/47 Q OTHER PUBLICATIONS
Stanworth, "Tellurite Glasses," J. Soc. Glass Tech., vol. 36, (1952) pp. 217–241, TP 845 S 678.

Primary Examiner—Winston A. Douglas
Assistant Examiner—Mark Bell
Attorney, Agent, or Firm—Richard D. Heberling; E. J. Holler

[57] ABSTRACT

Laser glass host compositions for effective lasing amounts of $Nd_2O_3$ are disclosed, the host compositions comprising $TeO_2$, SrO and ZnO in certain molar amounts. Also disclosed are methods of making highly effective laser articles, such as rods, and the new use of the above described glass compositions for forming laser articles, the new use including forming lasert articles from the compositions, pumping the resultant laser articles to provide an energy inversion, and lasing the pumped article.

8 Claims, 1 Drawing Figure

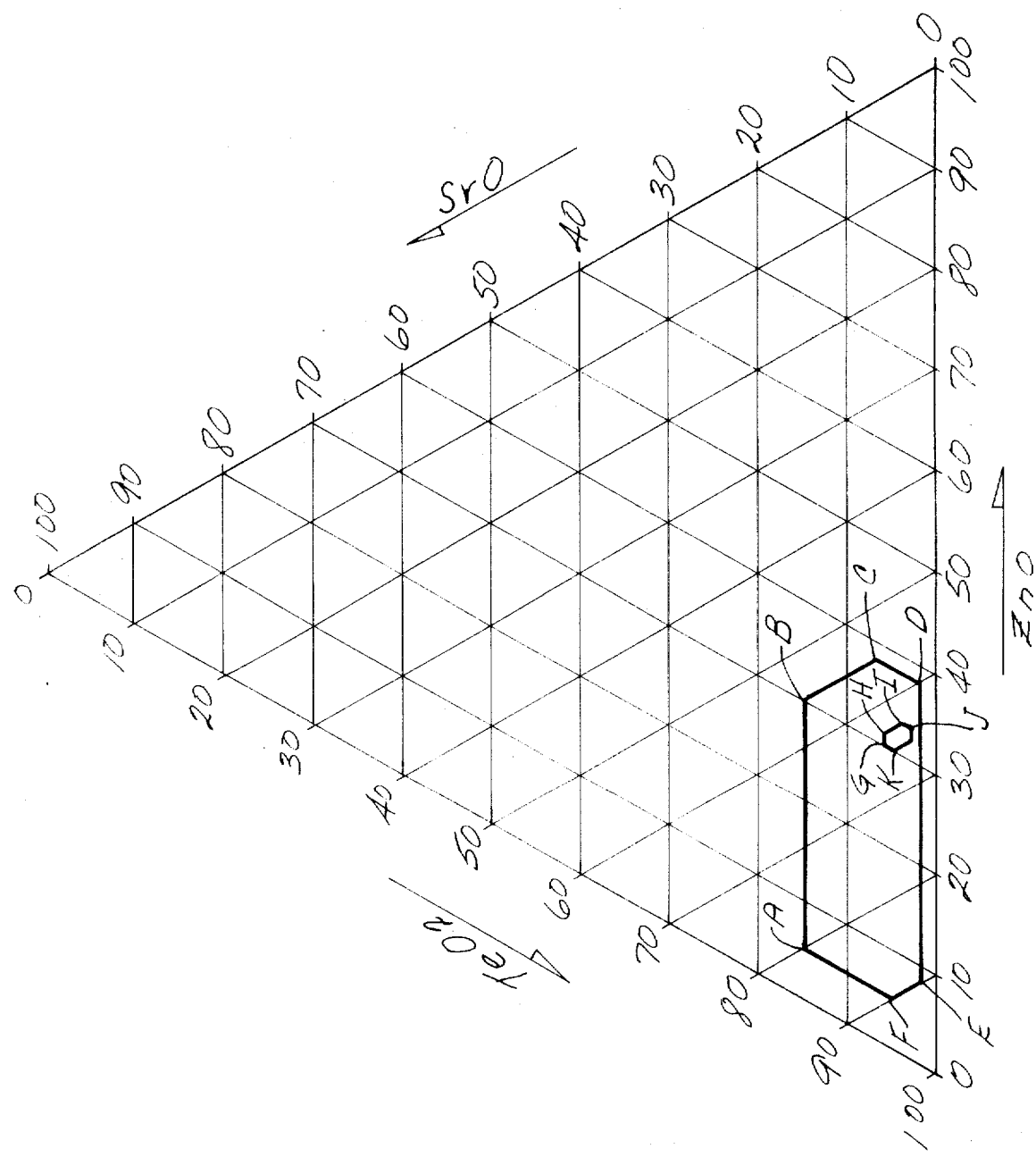

LASER GLASS HOST COMPOSITIONS COMPRISING $TeO_2$, SRO AND ZNO

INVENTION

The present invention relates to laser glass host compositions for effective lasing amounts of $Nd_2O_3$, the host compositions comprising $TeO_2$, SrO and ZnO in certain molar amounts. The present invention also relates to methods of making laser articles, such as rods, with increased efficiency, the methods including the steps of:

1. forming laser articles from glass compositions comprising certain amounts of $TeO_2$, SrO and ZnO, the glass composition being a host for an effective lasing amount of $Nd_2O_3$;
2. pumping the laser article to provide an energy inversion; and
3. lasing the pumped article.

The present invention also relates to a method for making an outstanding, highly efficient glass laser article, such as a rod, or a disc by:

1. melting laser glass batch-forming materials to provide a molten glass comprising certain amounts of $TeO_2$, SrO, ZnO and an effective lasing amount of $Nd_2O_3$;
2. forming a glass blank from the molten glass; and
3. fabricating the outstanding laser articles from the blank.

It is highly desirable to provide laser glass compositions that can be used to make outstanding highly-efficient glass laser articles. It is also desirable to provide a new use for glass compositions comprising $TeO_2$, SrO and ZnO in which the new use includes the steps of:

1. forming a glass laser article from the above-described glass composition that is a host for an effective lasing amount of $Nd_2O_3$;
2. pumping the laser article; and thereafter
3. lasing the pumped article.

It is an object of the present invention to provide a laser glass composition containing $TeO_2$, SrO and ZnO in which the proportions of $TeO_2$, SrO and ZnO, in molar amounts, are defined by the area within the heavy lines connecting the points ABCDEF of the ternary diagram of the FIGURE, and the glass composition is a host for an effective lasing amount of $Nd_2O_3$.

It is an object of the present invention to provide a method for making a glass article such as a laser rod, disc or the like, in which the method comprises the steps of:

1. melting laser glass batch-forming materials to provide a molten glass comprising $TeO_2$, SrO and ZnO, in which the proportions thereof, in molar amounts, are defined by the area within the heavy lines connecting points ABCDEF of the ternary diagram of the FIGURE the molten glass being a host for an effective lasing amount of $Nd_2O_3$;
2. forming a glass laser blank from the molten glass; and
3. fabricating a laser article from the blank to provide a very efficient laser article.

It is an object of the present invention to provide a new use for a glass composition as a glass laser article in which the glass comprises $TeO_2$, SrO and ZnO in certain proportions thereof and in which the glass composition is a host for an effective lasing amount of $Nd_2O_3$, the new use comprising the steps of:

1. forming a glass laser article from the glass composition comprising $TeO_2$, SrO and ZnO, along with the effective lasing amount of $Nd_2O_3$;
2. pumping the laser article to provide an energy inversion; and
3. lasing the pumped laser article.

It is an object of the present invention to provide a highly-efficient glass laser article, such as a rod or disc, made from a glass composition comprising $TeO_2$, SrO and ZnO, and containing an effective lasing amount of $Nd_2O_3$.

These and other objects will become apparent from the specification that follows, the appended claims, and the drawings, in which the FIGURE is a ternary diagram of the glass host composition of the present invention in which the molar proportions of $TeO_2$, SrO and ZnO are defined by the area within the heavy lines of the ternary diagram.

The present invention provides outstanding laser glass host compositions for effective lasing amounts of $Nd_2O_3$, the host compositions comprising $TeO_2$, SrO and ZnO in certain molar amounts that are defined generally by the area within the heavy lines connecting the points ABCDEF of the ternary diagram of the FIGURE of the drawings. Preferably, the molar amounts of $TeO_2$, SrO and ZnO are defined by the area within the heavy lines connecting the points GHIJKL in the ternary diagram.

The present invention also provides methods for making highly efficient glass laser articles, such as rods or discs, the methods including the steps of:

1. melting laser glass batch-forming materials to provide a molten glass comprising $TeO_2$, SrO and ZnO in which the molar amounts thereof are defined generally by the area within the heavy lines connecting the points ABCDEF of the ternary diagram, the molten glass capable of acting as a host for an effective lasing amount of $Nd_2O_3$;
2. forming a glass blank from the molten glass; and
3. fabricating the outstanding laser articles from the blank.

The present invention also provides the new use for a glass composition as a glass laser article in which the glass comprises $TeO_2$, SrO and ZnO, in which the proportions thereof, in molar amounts, are defined generally within the area formed by the heavy lines connecting points ABCDEF of the ternary diagram, in which the glass composition is a host for an effective lasing amount of $Nd_2O_3$, the new use comprising the steps of:

1. forming a glass laser article from the glass composition comprising $TeO_2$, SrO and ZnO, with an effective lasing amount of $Nd_2O_3$;
2. pumping the laser article to provide an energy inversion; and
3. lasing the pumped laser article.

A zinc tellurite glass consisting essentially of a major molar proportion of $TeO_2$ and between about 20 and 40 molar percent of ZnO is described and claimed in Redman, U.S. Pat. No. 3,423,326. These zinc tellurite glasses were reported as having some fluorescent activity when doped with $Nd_2O_3$.

As previously indicated, the outstanding laser glass host compositions of the present invention surprisingly exhibit much higher fluorescent activity than the zinc tellurite glasses of U.S. Pat. No. 3,423,326, the increased fluorescent activity indicating a greater lasing efficiency for laser articles made from the host compositions of the present invention. As previously described, only certain molar proportions of TeO$_2$, SrO and ZnO can be used to provide the highly efficient laser articles, such as rods and discs. The increase in fluorescent activity is generally at least about 50 percent and preferably at least about 60 or 70 percent, the increase often being as much as 100 percent or more. The increase is at least 50 percent when compared to the working examples of the Redman patent.

In the previously mentioned Redman U.S. Pat. No. 3,423,326, there is no mention of any glass system other than that of a glass host composition consisting essentially of tellurium oxide and zinc oxide. There is no suggestion in the previously mentioned Redman patent that highly efficient laser articles can be made from a host composition containing certain molar proportions of TeO$_2$, SrO and ZnO.

The outstanding laser glass host compositions of the present invention generally contain about 55–90 mole percent TeO$_2$, about 2–15 mole percent SrO and about 5–38 mole percent ZnO. As previously indicated, this host glass contains an effective lasing amount of Nd$_2$O$_3$ which preferably is about 0.01–1.5 mole percent.

Preferred compositions are those in which the glass host comprises about 63–65 mole percent TeO$_2$, about 3–6 mole percent SrO, and about 30–33 mole percent ZnO, the host composition containing a preferred amount of Nd$_2$O$_3$, which is in the range of about 0.01–1.5 mole percent.

Excellent glass laser compositions are those, for example, in which the host glass comprises about 65 mole percent TeO$_2$, about 5 mole percent SrO, and about 30 mole percent ZnO or a glass that comprises about 64 mole percent TeO$_2$, about 6 mole percent SrO, and 30 mole percent ZnO, or a glass that comprises about 63 mole percent TeO$_2$, about 4 mole percent SrO and about 33 mole percent ZnO.

In accordance with the present invention, increased lasing efficiency is obtained for glass laser rods and discs. The increase in fluorescent activity is surprisingly at least about 50 percent over that of a zinc tellurite glass containing 65 mole percent TeO$_2$ and 35 mole percent ZnO and at least 50 percent over that of a lithia-calcia-alumino silicate glass laser rod containing:

| Ingredient | Mole Percent |
|---|---|
| SiO$_2$ | 60 |
| Al$_2$O$_3$ | 2.5 |
| Li$_2$O | 27.5 |
| CaO | 10 |
| Nd$_2$O$_3$ | 0.5 | as set forth, for instance, in U.S. Pat. No. 3,471,409, to Lee and Rapp. In general, the highest fluorescent intensity value for a zinc tellurite glass, as above described, containing 35 mole percent ZnO, is about 2.09 when compared to the fluorescent intensity value of the above-described lithia-calcia-alumino silicate glass laser which is the reference glass arbitrarily held to be 1.0.

The following examples are intended to illustrate the present invention and not to limit the same in any way.

EXAMPLE 1
PART A

A 15 gram melt was prepared by mixing reagent grade raw materials, in the following molar percent and also for convenience, weight percent, with 30 ml. of water.

| | Mole percent | | Weight percent | |
|---|---|---|---|---|
| Ingredients | Host. Glass | Laser Article | Host Glass | Laser Article |
| TeO$_2$ | 85.0 | 84.5 | 91.1 | 89.6 |
| ZnO | 10.0 | 9.9 | 5.4 | 5.3 |
| SrO | 5.0 | 4.9 | 4.5 | 3.4 |
| Nd$_2$O$_3$ | — | 0.8 | — | 1.7 |

The slurry was mixed for 10 minutes and poured into a gold crucible. The crucible was placed in an air circulating oven with the temperature maintained at 110°C. overnight to remove the water. The crucible was then placed in an electric resistance furnace with the temperature at 750°C. for 3 hours, or until homogenous, after which the molten glass immediately poured into a preheated (260°C.) graphite mold forming a disc having an 11/16 inch diameter and ¼ inch thickness. The graphite mold was placed in an annealing oven maintained at 340°C. After 1 hour, at 340°C., the temperature of the annealing oven was lowered at a rate of 38°C. per hour to 250°C. after which the annealing oven was turned off and the mold cooled to room temperature.

The solid, annealed glass disc was removed from the mold, wet ground and polished with close tolerance to a thickness of 0.195 inches and a diameter of 0.687 inches. The refractive index of the finished polished glass disc was measured to be 2.14.

PART B

The polished glass disc from Part A was tested for fluorescence intensity and decay time in a high power pulsed test system. The disc was placed in a holder and exposed to a beam of light from an EG & G model FX 12-25 xenon flashlamp. The flashlamp has a flash duration of about 20 microseconds. The disc was not observed to solarize after repeated excitation by the flashlamp. The fluorescence intensity and decay time of the excited sample was measured by photographing the oscilloscope display of the 1,060 nanometer fluorescent intensity versus time on a Tektronix Model 556, Dual Trace oscilloscope connected to an RCA S-1 photomultiplier having a narrow band pass filter.

The fluorescence intensity measurement was normalized against ED-2, a glass laser composition of Owens-Illinois, Inc., comprising, in mole percent, 60.0% SiO$_2$, 2.5% Al$_2$O$_3$, 27.5% Li$_2$O, 10% CaO, 0.16% CeO$_2$ and 0.5% Nd$_2$O$_3$, disclosed in U.S. Pat. No. 3,471,409 as Example 1. The fluorescence intensity was found to be 3.15 when normalized against the glass laser composition; 3.15 times the intensity of the glass laser composition.

The fluorescence intensity was corrected for the refractive indices of the glass disc and the reference glass laser composition by FI (corrected) = FI (normalized) $[(1.56)^2/(\eta \text{ glass disc})^2]$ The corrected fluorescence intensity was 1.63. The fluorescence decay time was 147 microseconds.

EXAMPLE 2

PART A

A 15 gram melt was prepared and polished glass discs prepared therefrom as described in Part A of Example 1 except the molar or weight percentages of the raw materials were as follows:

| Ingredients | Mole Percent | | Weight Percent | |
|---|---|---|---|---|
| | Host Glass | Laser Article | Host Glass | Laser Article |
| $TeO_2$ | 75.0 | 74.4 | 84.8 | 83.4 |
| ZnO | 20.0 | 19.8 | 11.5 | 11.3 |
| SrO | 5.0 | 4.9 | 3.7 | 3.6 |
| $Nd_2O_3$ | — | 0.7 | — | 1.7 |

The refractive index of the finished polished glass disc was measured to be 2.08.

PART B

The polished glass disc from Part A was tested for fluorescence intensity and decay time as described in Part B of Example 1. The normalized fluorescence intensity was 3.1 and the corrected fluorescence intensity was 1.69. The fluorescence decay time was 154 microseconds.

EXAMPLE 3

PART A

A 15 gram melt was prepared and polished glass discs prepared therefrom as described in Part A of Example 1 except the molar or weight percentages of the raw materials were as follows:

| Ingredients | Mole Percent | | Weight Percent | |
|---|---|---|---|---|
| | Host Glass | Laser Article | Host Glass | Laser Article |
| $TeO_2$ | 66.7 | 66.3 | 79.1 | 77.8 |
| ZnO | 28.3 | 28.1 | 17.1 | 16.8 |
| SrO | 5.0 | 4.9 | 3.8 | 3.7 |
| $Nd_2O_3$ | — | 0.7 | — | 1.8 |

The refractive index of the finished polished glass disc was measured to be 2.06.

PART B

The polished glass disc from Part A was tested for fluorescence intensity and decay time as described in Part B of Example 1. The normalized fluorescence intensity was 2.29 and the corrected fluorescence intensity was 1.27. The fluorescence decay time was 162 microseconds.

EXAMPLE 4

PART A

A 15 gram melt was prepared and polished glass discs prepared therefrom as described in Part A of Example 1 except the molar or weight percentages of the raw materials were as follows:

| Ingredients | Mole Percent | | Weight Percent | |
|---|---|---|---|---|
| | Host Glass | Laser Article | Host Glass | Laser Article |
| $TeO_2$ | 63.7 | 63.0 | 76.8 | 75.4 |
| ZnO | 31.3 | 31.6 | 19.5 | 19.2 |
| SrO | 5.0 | 4.7 | 3.7 | 3.6 |
| $Nd_2O_3$ | — | 0.7 | — | 1.8 |

The refractive index of the finished polished glass disc was measured to be 2.04.

PART B

The polished glass disc from Part A was tested for fluorescence intensity and decay time as described in Part B of Example 1. The normalized fluorescence intensity was 2.73 and the corrected fluorescence intensity was 1.55. The fluorescence decay time was 154 microseconds.

Other specific compositions set forth as being suitable for use in the present invention can be substituted for the specific glass laser compositions used in the working examples to provide substantially equivalent results; for instance, any of the compositions set forth within the area formed by the heavy lines connecting the points ABCDEF of the ternary diagram can be used in place of the specific laser compositions used in the working examples. Thus, a host glass comprising about 65 mole percent $TeO_2$, about 5 mole percent SrO and about 30 mole percent ZnO can be used for the specific host composition set forth in Examples 1 and 2. Likewise, a laser glass host composition comprising 64 mole percent $TeO_2$, about 6 mole percent SrO, and 30 mole percent ZnO, as well as a glass host comprising about 63 mole percent $TeO_2$, about 4 mole percent SrO, and about 33 mole percent ZnO, can be used to provide substantially equivalent results.

What is claimed is:

1. A laser glass, host composition comprising $TeO_2$, SrO and ZnO in which the proportions of $TeO_2$, SrO and ZnO in molar amounts are defined by the area within the heavy lines connecting the points ABSDEF of the ternary diagram of the FIGURE of the drawings, the laser glass host composition being a host for an effective lasing amount of $Nd_2O_3$.

2. A laser glass host composition as defined in claim 1 in which the proportions of $TeO_2$, SrO and ZnO are defined by the areas within the heavy lines connecting the points GHIJKL in the ternary diagram of the FIGURE of the drawings.

3. A laser glass composition comprising:
   1. a host glass containing about 55–90 mole percent $TeO_2$, about 2–15 mole percent SrO, and about 5–38 mole percent ZnO; and
   2. an effective lasing amount of $Nd_2O_3$.

4. A laser glass host composition comprising about 63–65 mole percent $TeO_2$, about 3–6 mole percent SrO, and about 3–33 mole percent ZnO, the host composition containing about 0.01–1.5 mole percent $Nd_2O_3$.

5. A laser glass composition as defined in claim 3 in which the host glass comprises about 64 mole percent $TeO_2$, about 5 mole percent SrO, and about 30 mole percent ZnO.

6. A laser glass composition as defined in claim 3 in which the host glass comprises about 64 mole percent $TeO_2$, about 6 mole percent SrO, and about 30 mole percent ZnO.

7. A laser glass composition as defined in claim 3 in which the glass host comprises about 63 mole percent $TeO_2$, about 4 mole percent SrO, and about 33 mole percent ZnO.

8. The new use for a glass composition as a glass laser article in which the glass comprises $TeO_2$, SrO and ZnO in which the proportions thereof in molar amounts are defined within the area formed by the heavy lines connecting the points ABCDEF of the ternary diagram of the FIGURE of the drawings, and which glass composition is a host for an effective lasing amount of $Nd_2O_3$, the new use comprising the steps of:

1. forming a glass laser article from the glass composition comprising $TeO_2$, SrO and ZnO with an effective lasing amount of $Nd_2O_3$;
2. pumping the laser article to provide an energy inversion; and
3. lasing the pumped laser article.

* * * * *